US007225401B2

(12) United States Patent
Purvis

(10) Patent No.: US 7,225,401 B2
(45) Date of Patent: May 29, 2007

(54) CASE-BASED SYSTEM AND METHOD FOR GENERATING A CUSTOM DOCUMENT

(75) Inventor: Lisa S. Purvis, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 1009 days.

(21) Appl. No.: 10/202,227

(22) Filed: Jul. 23, 2002

(65) Prior Publication Data
US 2004/0019855 A1 Jan. 29, 2004

(51) Int. Cl.
*G06F 15/00* (2006.01)
*G06F 7/00* (2006.01)

(52) U.S. Cl. .......................... 715/530; 715/517; 707/1; 707/3; 707/4; 707/5; 707/6

(58) Field of Classification Search ................ 715/530, 715/517; 707/1–6; 705/530
See application file for complete search history.

(56) References Cited

U.S. PATENT DOCUMENTS

| | | | |
|---|---|---|---|
| 5,224,206 A | | 6/1993 | Simoudis |
| 5,517,621 A | | 5/1996 | Fukui et al. |
| 5,943,670 A | | 8/1999 | Prager |
| 5,978,785 A | * | 11/1999 | Johnson et al. ............... 706/54 |
| 6,014,678 A | | 1/2000 | Inoue et al. |
| 6,021,411 A | * | 2/2000 | Brophy et al. ................. 707/5 |
| 6,023,714 A | | 2/2000 | Hill et al. |
| 6,044,384 A | | 3/2000 | Ishima et al. |
| 6,081,798 A | * | 6/2000 | Johnson et al. ............... 706/54 |
| 6,134,563 A | | 10/2000 | Clancey et al. |
| 6,173,286 B1 | | 1/2001 | Guttman et al. ............ 707/100 |
| 6,212,528 B1 | | 4/2001 | Brophy et al. |
| 6,405,195 B1 | * | 6/2002 | Ahlberg ......................... 707/4 |
| 6,571,251 B1 | * | 5/2003 | Koski et al. .................... 707/3 |
| 6,668,354 B1 | | 12/2003 | Chen et al. |
| 6,782,376 B2 | * | 8/2004 | Sato et al. ..................... 706/47 |
| 2001/0051962 A1 | | 12/2001 | Plotkin |
| 2002/0103829 A1 | * | 8/2002 | Manning et al. ............ 707/513 |
| 2004/0019847 A1 | | 1/2004 | Purvis |
| 2004/0019850 A1 | | 1/2004 | Purvis |
| 2004/0019851 A1 | | 1/2004 | Purvis |
| 2004/0019852 A1 | | 1/2004 | Purvis |
| 2004/0024613 A1 | | 2/2004 | Harrington |
| 2004/0025109 A1 | | 2/2004 | Harrington |
| 2004/0034613 A1 | | 2/2004 | Purvis |
| 2004/0205472 A1 | | 10/2004 | Purvis |
| 2004/0205588 A1 | | 10/2004 | Purvis |
| 2004/0205609 A1 | | 10/2004 | Milton et al. |

FOREIGN PATENT DOCUMENTS

JP        404116765 A   *  4/1992

OTHER PUBLICATIONS

Bradley et al., "Case-Based User Profiling for Content Personalisation", Proceedings of the International Conf. on Hypermedia, Brusilovsky et al(eds.), Adaptive Hypermedia & Adaptive Web-based Systems, Lecture Notes in Computer Science, vol. 1892, Springer Verlag Publishers, © 2000, pp. 11.*

Iwai et al., "A Document Layout System Using Automatic Document Architecture Extraction", 1989, ACM, pp. 369-374.*

Holzner, Steven, Inside XML, New Riders Publishing, Indianapolis, IN, © 2001, pp. 68-73, 77-87, 402-412, 620-621, 626-643, 656-660 and 666-671.

Bradley, Keith, et al., "Case-Based User Profiling for Content Personalisation", Proc's of Int'l Conf on Hypermedia, Brusilovsky et al (eds), Adaptive Hyperm. & Adaptive Web-Based Systems Lecture Notes in CS, vol. 1892, Springer Verlag, © 2000 (11 pages).

Villard, Lionel, et al., "An Incremental XSLT Transformation Processor for XML Document Manipulation", WWW 2002, Honolulu, HI, May 7-11, 2002, pp. 474-485.

Mendes, Emilia, et al. "A Comparison of Case-Based Reasoning Approaches to Web Hypermedia Project Cost Estimation", WWW 2002, Honolulu, HI, May 7-11, 2002, pp. 272-280.

Dengler, E. Friedell, M., Marks, J., Constraint-Driven Diagram Layout, Proceedings of the 1993 IEEE Symposium on Visual Languages, pp. 330-335, Bergen, Norway, 1993 (diagrams).

Rousseau, F., Garcia-Macias, A., Valdeni de Lima, J., and Duda, A., *User Adaptable Multimedia Presentations for the WWW*, Electronic Proceedings from the 8th International World Wide Web Conference, 1999 (multimedia presentations).

Graf, W. H., *The Constraint-Based Layout Framework LayLab and Applications*, Electronic Proceedings of the ACM Workshop on Effective Abstractions in Multimedia, 1995 (flowcharts and yellow pages).

Kroener, A., *The Design Composer: Context-Based Automated Layout for the Internet*, Proceedings of the AAAI Fall Symposium Series: Using Layout for the Generation, Understanding, or Retrieval of Documents, 1999.

Badros G., Borning A., *The Cassowary Linear Arithmetic Constraint Solving Algorithm: Interface and Implementation*, University of Washington Technical Report, Jun. 4, 1998.

Purvis, Lisa, *Document Assembly and Transformation: A Survey*, XR&T/DITC/CADISYS/DI, Mar. 2001.

* cited by examiner

*Primary Examiner*—William Bashore
*Assistant Examiner*—Chau Nguyen

(57) ABSTRACT

What is disclosed is a case-based method which specifies previously created documents as cases in a case base, and provides a generalized method for using these previous documents to create a new desired document. The new problem (i.e., the document you are trying to create) is expressed, using any/all case features (e.g., new problem constraints, creator intent, document-genre, etc.). A matching process is performed in order to retrieve documents similar to the desired document from the case base. A selection process chooses one or several of the best matching cases as starting points for creating the new document. The retrieved document(s) are then adapted to create the new desired document. This new document is optionally stored back into the case base as a new case.

6 Claims, No Drawings

CASE-BASED SYSTEM AND METHOD FOR GENERATING A CUSTOM DOCUMENT

FIELD OF THE INVENTION

The present invention is directed to systems and methods to find document components and assemble them into a custom document and, in particular, those systems and methods which use case-based approaches wherein previously created documents are cases in a case base, and the cases are used to help generate new documents that adhere to the desired constraints and design criteria.

BACKGROUND OF THE INVENTION

Custom documents are documents that are personalized or tailored in some way to the particular user of the document. Two growing applications of custom documents are in the domain of variable data printing, as well as in web personalization.

Traditional approaches to custom document creation are non-automated and therefore user-intensive, and result in documents that are typically quite similar: the layout is the same for all instances, regardless of the available content pieces. Furthermore, the document creator is responsible for ensuring that the final document adheres to good design principles, and is therefore aesthetically pleasing. Thus the document creator himself typically creates the document template according to his preferred design criteria, which requires knowledge about document design and how to best achieve the desired qualities in a particular instance of the document.

Known methods for automated creation of documents have focused more on the particular types of documents, and not on modeling the problem in a general way in order to address all types of documents. Existing work provides methods for creating diagrams (see Dengler, E. Friedell, M., Marks, J., *Constraint-Driven Diagram Layout*, Proceedings of the 1993 IEEE Symposium on Visual Languages, pages 330–335, Bergen, Norway, 1993), or multimedia presentations (see Rousseau, F., Garcia-Macias, A., Valdeni de Lima, J., and Duda, A., *User Adaptable Multimedia Presentations for the WWW*, Electronic Proceedings from the $8^{th}$ International World Wide Web Conference, 1999), or flowcharts and yellow pages (see Graf, W. H., *The Constraint-Based Layout Framework LayLab and Applications*, Electronic Proceedings of the ACM Workshop on Effective Abstractions in Multimedia, 1995). Others have explored automating the process of web document layout (see Kroener, A., *The Design Composer: Context-Based Automated Layout for the Internet*, Proceedings of the AAAI Fall Symposium Series: Using Layout for the Generation, Understanding, or Retrieval of Documents, 1999). None of the existing automated approaches use past experience to help generate a new document.

Using past experience to help in the generation of new documents is limited to whatever experience the human creator applies when creating a new document. This experience is not readily transferable from one document to the next, unless that same expert creates all documents, and is able to remember the particulars of his past documents. Furthermore, there is no easy way for a novice creator or programmatic (non-human) creator to draw upon this experience in order to create a document.

What is needed in the art in order to enable an efficient and experience-guided assembly of a custom document, is a means for finding existing documents that are similar to the current desired document, and using the existing documents as a starting point for problem solving.

SUMMARY OF THE INVENTION

What is disclosed is a case-based method for seeding a document creation system with an initial feasible solution, and a process for using that solution to create the final intended output document. The present method specifies previously created documents as cases in a case base, and provides a generalized method for using these previous documents to create a new desired document. These previous documents are stored as cases. Each case contains the content pieces that make up the document, along with their style and layout information. In the case of variable data documents, each case also contains information about the individual that the document was created for (e.g., the database record originally used to create the document). The present method specifies previously created documents as cases in a case base, and provides a generalized method for using these previous documents to create a new desired document. The new problem (i.e., the document you are trying to create) is expressed, using any/all case features (e.g., new problem constraints, creator intent, document-genre, etc.). A matching process is performed in order to retrieve documents similar to the desired document from the case base. A selection process chooses one or several of the best matching cases as starting points for creating the new document. The retrieved document(s) are then adapted to create the new desired document. This new document is optionally stored back into the case base as a new case.

DETAILED DESCRIPTION OF THE INVENTION

What is disclosed is a case-based method for seeding a document creation system with an initial feasible solution, and a process for using that solution to create the final intended output document. The present method specifies previously created documents as cases in a case base, and provides a generalized method for using these previous documents to create a new desired document. These previous documents are stored as cases. Each case contains the content pieces that make up the document, along with their style and layout information. In the case of variable data documents, each case also contains information about the individual that the document was created for (e.g., the database record originally used to create the document).

The present method comprises the steps of making a case representation of a plurality of previously generated documents collected together into a case base wherein the case representation includes required layout and content constraints or alternatively, desired aesthetic constraints. Advantageously, the case representation could include both required and desired layout, content, and aesthetic constraints or could include a specification of document parameters that can be adjusted. The next step comprises representation of the newly desired document preferably wherein the newly desired document is represented as a combination of value/property pairs and constraints. Then, matching the newly desired document to similar existing documents in said collected case base. Then, selecting at least one of the best matching cases as a starting point for creating the new document. The method could also include adapting similar cases to better match the desired document. The constraint optimization algorithm is preferably used as the adaptation method wherein a document creator changes some of the layout/content/aesthetic constraints associated with the similar document(s) before beginning the adaptation process. The newly created desired document is then stored back into the case base as a new case.

The invention is the unique application of the case-based reasoning paradigm to document creation. As such, the steps required are: develop a case representation for a document (e.g., value/property pairs such as document-genre: brochure, intent: eye-catching, pageHeight: 750), initialize a case base with previously generated documents, in their case representation. Express the newly desired document in the case representation. Perform a matching process between the newly desired document and the documents in the case base to find those that match the best. Perform a selection process to select one or several of the best matching documents as starting points for the new document. Perform an adaptation process on the selected documents to create the final desired output document. Optionally store the newly created document as a new case in the case base.

In one embodiment of this invention, the cases are stored as constraint satisfaction problems, and a constraint satisfaction process is used to achieve the adaptation.

In another embodiment of this invention, the cases are stored as constraint optimization problems, and a constraint optimization process is used to achieve the adaptation.

In another embodiment of this invention, the cases are style sheets rather than final documents, and the adaptation process produces a style sheet as the final output.

The present invention has many advantages over the prior art. Whereas the art in automated document creation provide methods for automatically assembling a custom document, this invention suggests that such an assembly of a document must not always be done from scratch. We use a case-based approach to begin with a tentative solution that is close to what we desire, and use an adaptation mechanism to transform that solution to meet exactly the requirements of our new document. This approach has several advantages: first, the document creation expertise is stored in a case-base that can be used by applications to ease the burden of document creation for novice users, or for situations where there is no human creator. Second, this expertise is therefore more readily transferred from document to document, resulting in better output documents. Third, starting from a partial solution helps the document assembly process to be more efficient.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is desired to be secured by United States Letters Patent is:

1. A method for automatically selecting an electronic document from a document case base to be used in creating a new electronic document, comprising:
   (a) inputting features defining an electronic document to be created;
   (b) searching an electronically stored document case base for document, stored therein, substantially matching the inputted features;
   (c) selecting, automatically, one of the substantially matched documents: and
   (d) modifying, automatically, the selected document to correspond to the inputted features to create an electronic document to be used in creating a new electronic document.

2. The method as claimed in claim 1 wherein the inputted features includes required layout and content constraints for the electronic document to be created.

3. The method as claimed in claim 1 wherein the inputted features includes desired aesthetic constraints for the electronic document to be created.

4. The method as claimed in claim 1 wherein the inputted features includes both required and desired layout, content and aesthetic constraints for the electronic document to be created.

5. The method as claimed in claim 1 wherein the inputted features includes a specification of document parameters that can be adjusted for the electronic document to be created.

6. The method as claimed in claim 1 wherein the inputted features includes a style for the electronic document to be created.

* * * * *